3,775,346
METHOD OF PREPARING SUPPORTED OXIDATION CATALYSTS FOR PRODUCING ETHYLENE OXIDE

Benedetto Calcagno and Natale Ferlazzo, Milan, and Marcello Ghirga, Bresso, Italy, assignors to Società Italiana Resine S.I.R. S.p.A., Milan, Italy
No Drawing. Continuation-in-part of abandoned application Ser. No. 877,492, Nov. 17, 1969. This application Aug. 26, 1971, Ser. No. 175,369
Claims priority, application Italy, Nov. 23, 1968, 24,088/68
Int. Cl. B01j 11/00, 11/06
U.S. Cl. 252—463         6 Claims

ABSTRACT OF THE DISCLOSURE

Ethylene oxidation catalysts are prepared by impregnating a support with a high-boiling inert organic liquid such as decane or ethylene glycol, further impregnating the support with a solution of silver lactate in lactic acid, drying and heating.

CROSS REFERENCE TO RELATED APPLICATIONS

This application is a continutaion-in-part application of copending application Ser. No. 877,492, filed Nov. 17, 1969, and now abandoned.

BACKGROUND OF THE INVENTION (1) Field of the invention

The present invention relates to silver-containing catalysts supported on a base, for use in the preparation of ethylene oxide by the method whereby that compound is obtained by the high-temperature oxidation of ethylene in the presence of oxygen or of oygen-containing gases.

(2) Description of the prior art

As is well known, silver-containing supported catalysts can be obtained by the direct deposition of a coating of the catalytically active metal on an inert support.

Another method of depositing the active metal involves the impregnation of the support with a decomposable compound of the metal, which is then caused to decompose within the support.

As such catalysts are of relatively low activity in processses whereby ethylene is oxidized to form the corresponding oxide, attempts have been made to increase the surface area of the catalytic metal and hence ultimately to render the catalyst more active.

However, an increase in the catalytic surface area obtained, for example, by making the silver spongy or rough, is often accompanied by loss of adhesion between the metal and the support. The results are that such catalysts cannot be used in industry, because of their poor mechanical properties.

It has now been discovered that it is possible to reduce the drawbacks inherent in the present state of the art and to obtain silver-containing supported catalysts that can be used for oxidizing ethylene in gaseous phase to its corresponding oxide, by a method which is simple and economically satisfactory.

The object of the present invention is to provide catalysts of the kind just mentioned, which have high activity and selectivity, and the method by which they can be prepared.

SUMMARY OF THE INVENTION

The method here proposed consists essentially in the addition and evaporation, in the course of preparing the catalyst, of certain organic substances, in the manner described hereunder.

To be more precise, by the method here proposed, the support in divided form is first impregnated with one or preferably more organic liquids, inert at the conditions of operation, with boiling points lying between 150° C. and 330° C.

The particles obtained are then impregnated with a solution containing lactic acid and silver lactate, with or without water, this being followed by drying.

Finally, the dried material is subjected to heat treatment up to a maximum temperature of between 230° C. and 360° C.

In this way, there is both decomposition of the silver salt and evaporation of the organic liquids added.

This procedure has been found to yield catalysts having a large catalytic surface area and hence high activity, as well as excellent adhesion between the silver and its support, which means that the mechanical properties are good.

DETAILED DESCRIPTION OF THE INVENTION

The catalysts with which this invention is concerned contain from 7% to 30% by weight of silver, in terms of the metal, in relation to the support.

Other metals may also be present, such as, for example, palladium, gold and platinum, to the extent of from 0.01% to 1.0% by weight in relation to the metallic silver.

These may be added in metal form, suspended in the solution of lactic acid and silver lactate, or in the form of salts in combination with the lactic acid in that solution.

Materials that may be used by way of support are alumina, silicon carbide, magnesium oxide or combinations of such substances, particularly in the form of spheres having a diameter of 4 mm. to 9 mm.

One substance that is particularly advantageous for the purpose is alpha alumina which has been activated by treatment at a temperature above 1,000° C. In order to firmly hold the silver to the support, the alpha alumina is one having a surface area of from 0.01 to 1.0 sq. m./g. and a porosity of 10% to 40%, with pores having a mean diameter of between 30 and 150 microns.

For the purposes of the invention, the inert, divided support is impregnated with one or more organic liquids. Use may be made, for this purpose, of those organic liquids which are inert at the conditions of operation and which boil at between 150° C. and 330° C. Suitable such liquid solvents which have boiling points ranging from 150° C. to 330° C. and are inert under the conditions of operation are saturated aliphatic hydrocarbons having from 10 to 16 carbon atoms in the molecule. The aliphatic hydrocarbons can be both straight and branch chain hydrocarbons such as n-decane, n-undecane, n-dodecane, n-tetradecane, n-hexadecane. Poly-hydroxyl compounds such as ethylene glycol, diethylene glycol and triethylene glycol can also be used. For the impregnation, which is carried out at or slightly above ambient temperature, between 15° C. and 40° C., for example, one or more of the organic liquids referred to above are employed in quantities of from 3% to 10% by weight in relation to the weight of the support.

These liquids, as employed in preparing the catalysts according to the process of this invention, vaporize during the heat treatment (during which the decomposable silver salts decompose and silver metal is deposited) thereby modifying the nature of the deposited silver.

For quantities of less than 3%, the results are not high enough to be noteworthy, nor is it desirable to use more than 10%, because the mechanical properties of the finished catalysts are decreased.

The best results are obtained from the employment of several of the organic liquids already mentioned, having boiling points which differ so as to produce successive evaporations during the preparation of the catalyst.

The particles thus impregnated are then subjected to further impregnation with a solution containing lactic acid and silver lactate.

The content of silver lactate in this solution is such as to yield a content of metallic silver between the limits already described in the finished catalyst, while the ratio between the total mols of lactic acid (free and salified) and the atoms of silver is maintained at between 1:1 and 2:1.

The other metals, platinum, palladium and gold, may be added in the form of salts of lactic acid or in the form of metal suspended in the solution, in the amounts specified above.

The second impregnation is carried out at a temperature of 60° C. to 90° C. and it as well to add to the solution small quantities of peroxide compounds such as, for instance, hydrogen peroxide or peroxy-acetic acid.

The impregnated particles are then subjected to drying in air at temperatures at ranging from 60° C. to 135° C.

The total drying times range between 0.5 and 48 hours.

Finally, the dried substance is subjected to heat treatment, the temperature being raised gradually to maximum levels of from 230° C. to 360° C. over periods of 1 hour to 12 hours.

The catalysts obtaned are highly active and selective in the process whereby ethylene is oxidized to ethylene oxide.

Thus, for example, in processes in which the initial gas consists of ethylene and oxygen diluted with inert gas, ethylene conversions of 25% to 40% are obtainable with yields of 70% or more of ethylene oxide.

The catalysts with which this invention is concerned have proved particularly suitable, moreover, for the production of ethylene oxide by the oxidation of ethylene in the vapor phase, described in a previous patent application filed by the present applicants, the method consisting essentially in feeding into the reaction chamber ethylene and oxygen, substantially pure, separately and/or mixed together, in such a way that the amount of ethylene in the gas at entry is over 86% by volume.

The process in question is carried out at temperatures of 150° C. to 350° C. and pressures between 1 atmosphere and 30 atmospheres, with contact periods of 1 second to 10 seconds.

The selectivity obtained in those conditions likewise has been 70%, and generally higher, with respect to the ethylene converted.

Finally, the catalysts here proposed, which are prepared simply and economically, possess sufficiently high mechanical properties to enable them to be used commercially over long periods. In fact, these catalysts have been shown by abrasion tests to be as strong mechanically as the materials used for the support.

The following experimental examples will serve to illustrate the invention further.

EXAMPLE 1

A quantity of 50 g. of alpha alumina, in the form of spheres 4 mm. in diameter, was impregnated at ambient temperature with 2 g. of ethylene glycol.

The alpha alumina used in this experiment had been activated by being heated to 1,100° C. and had a surface area of less than 1 sq. m./g.

The impregnated spheres then received an addition of a solution consisting of 10.5 g. of lactic acid to which 8.5 g. of silver oxide had been added. In addition, 0.8 g. of hydrogen peroxide was added to the solution and impregnation was carried out at about 84° C. Then the spheres were rolled in a rotary evaporator, in a stream of hot air at 140° C, for 10 minutes.

The product so obtained was then heated for 30 minutes at temperatures from 96° C. to 135° C., still in a stream of air.

The dried product was next placed in an oven and the temperature was raised from 140° C. to 180° C. in 4 hours.

The product was finally put into a muffle furnace at 180° C. and the temperature was raised by 20° C. per hour up to 210° C. and then maintained for 2 hours at 210° C. to 220° C., finally being increased to 280° C. over a period of 3 hours.

Activation was finally completed at 280° C. for 2 hours.

EXAMPLE 2

Of the catalyst prepared as described in Example 1, 16 g. was placed in a reaction vessel having an inside diameter of 7.8 mm.

A gas mixture containing 6.4% by volume of oxygen, 5.3% by volume of ethylene and 19.2% of methane, the remainder consisting of nitrogen, was then fed into the reaction vessel at 10 liters N per hour.

An addition of 2 p.p.m. of dichloro-ethane was made to the gas mixture.

The operating pressure was 44 mm./Hg above atmospheric and the operating temperature was 265° C.

With a contact period of 3.1 seconds, 30.8% of the ethylene put in was converted to give a yield of 70% of ethylene oxide.

EXAMPLE 3

The same procedure was followed as in Example 2, using a gas mixture consisting of 7.9% by volume of oxygen, 6.5% by volume of ethylene and 86.5% of nitrogen.

At a rate of flow of 750 liters of gas (measured at ambient temperature and pressure) per liter of catalyst per hour, a 25.5% conversion of ethylene was obtained, with 68% selectivity in ethylene oxide.

EXAMPLE 4

50 g. of alpha-alumina in the form of balls 4 mm. in diameter were impregnated at room temperature with 3 g. of n-tetradecane. The alpha-alumina had been activated by heating to 1,100° C., of a surface area smaller than 1 sq. m./g. The impregnated balls were then added to a solution consisting of 10.5 g. lactic acid which had been previously admixed with 8.5 g. silver oxide.

The solution was admixed also with 0.8 g. of oxygenated water and the impregnation was carried out at about 85° C.

The balls were then caused to roll in the rotating evaporator under a flow of hot air at 140° C. for 10 minutes.

The resulting product was subsequently heated for 30 minutes at temperatures of from 96 to 135° C., still in an air flow.

The dried product was then placed into an oven and the temperature was raised from 140° C. to 180° C. within 4 hours.

Finally, the product was placed in a tunnel oven at a temperature of 180° C., and the temperature was raised by 20° C. per hour, up to 210° C.

The temperature was maintained for two hours at 210–220° C., then increased to 280° C. within three hours.

The activation was completed at 280° C. for two hours.

EXAMPLE 5

The procedure as described in Example 4 was repeated, using 6 g. n-tetradecane.

EXAMPLE 6

The procedure as described in Example 4 was repeated, using 3 g. of a mixture of equal parts of n-tridecane and n-tetradecane.

EXAMPLE 7

The procedure as described in Example 4 was repeated, using 3 g. of a mixture of equal parts of n-tridecane and n-tetradecane.

EXAMPLE 8

The procedure as described in Example 4 was repeated, using 3 g. of a mixture of equal parts of n-dodecane, n-tridecane, n-tetradecane.

EXAMPLE 9

The procedure as described in Example 4 was repeated, using 6 g. of a mixture of equal parts of n-dodecane, n-tridecane, n-tetradecane.

EXAMPLE 10

16 g. of the catalyst prepared as described above in Example 4 were charged to a reactor of 7.8 mm. inner diameter.

The reactor was then fed with 254 N liter/hour of a gaseous mixture comprising 6.4% by volume oxygen, 5.3% by volume ethylene, 19.2% by volume methane, the remainder being nitrogen.

The gaseous mixture was admixed with 2 p.p.m. dichloroethane. The reaction was carried out at 12 atm. and 275° C., the contact period amounting to about 2.7 seconds. By proceeding under these conditions, a 33.0% ethylene feed conversion was obtained with a selectivity amounting to 72% with respect to the converted ethylene.

EXAMPLE 11

The procedure as described in Example 10 and the catalyst of Example 5 were employed. A conversion of 37.5% and a selectivity of 71% were obtained.

EXAMPLE 12

The procedure as described in Example 10 with the catalyst of Example 6 was used. A conversion of 31.3% and a selectivity of 73% were obtained.

EXAMPLE 13

The procedure as described in Example 10 with the catalyst of Example 7 were used. A conversion of 35.4% and a selectivity of 72% were obtained.

EXAMPLE 14

The procedure used was as described in Example 10, and a gaseous mixture, comprising 7.9% by volume oxygen, 6.5% by volume ethylene and 86.5% by volume nitrogen was fed to the reactor. The catalyst described in Example 8 was employed.

The ethylene conversion amounted to 38.1% and the selectivity to 71%.

EXAMPLE 15

The procedure used was as described in Example 10, and a gaseous mixture, comprising 7.0% by volume oxygen, 6.5% by volume ethylene and 86.5% by volume nitrogen was supplied to the reactor. The catalyst of Example 9 was employed.

The conversion was 40.2% and the selectivity 70%.

What is claimed is:

1. A method of preparing supported catalysts suitable for use in the oxidation of ethylene to ethylene oxide and consisting essentially of silver to the extent of from 7% to 30% by weight in relation to the support, comprising:
   impregnating a solid, inert, divided support comprising $\alpha$-alumina which has been activated by being subjected to temperatures above 1000° C. and has a surface area from 0.01 to 1.0 s. m./g. and a porosity of 10% to 40%, with a mean pore diameter of 30 to 150 microns with one or more saturated aliphatic hydrocarbons, in quantities of from 3% to 10% by weight in relation to the support, said aliphatic hydrocarbons being inert at the operating conditions and having boiling points between 150° C. and 330° C.;
   further impregnating the particles with a solution containing lactic acid and silver lactate, at a temperature of 60° C. to 90° C., the ratio between the total mols of lactic acid, both free and salified, and the atoms of silver being between 1:1 and 2:1;
   subjecting the impregnated particles to a drying process in a stream of air at temperatures of 60° C. to 135° C. for periods of 0.5 to 48 hours; and
   heat treating the dried impregnated particles up to maximum temperatures of between 230° C. and 360° C. for periods of 1 hour to 12 hours.

2. A method as in claim 1, in which one or more of the metals selected from the group consisting of gold, platinum and palladium are added to the catalyst in quantities of from 0.01% to 1.0% by weight in relation to the metallic silver, said metals being added in metal form suspended in the solution containing silver lactate and lactic acid, or in the form of lactic acid salts dissolved in that solution.

3. The method of claim 1, wherein said support is in the form of spheres having a diameter of between 4 mm. and 9 mm.

4. A method as in claim 1, in which said saturated aliphatic hydrocarbon has from 10 to 16 carbon atoms.

5. A method as in claim 4, in which said hydrocarbon is selected from the group consisting of n-dodecane, n-tridecane, n-tetradecane and mixtures thereof.

6. A method as in claim 1, in which the impregnation of said hydrocarbon liquid is at temperatures ranging between 15 and 40° C.

References Cited

UNITED STATES PATENTS

| | | | |
|---|---|---|---|
| 2,920,052 | 1/1960 | Martin | 252—463 |
| 2,424,083 | 7/1947 | Finch et al. | 252—204 |
| 2,901,441 | 8/1959 | Waterman | 252—463 |
| 3,144,416 | 8/1964 | Hosoda | 252—476 |

FOREIGN PATENTS

| | | | |
|---|---|---|---|
| 1,115,192 | 5/1968 | Great Britain | 252—476 |

CARL F. DEES, Primary Examiner

U.S. Cl. X.R.

252—476